US009657549B2

United States Patent
Krumrine et al.

(10) Patent No.: US 9,657,549 B2
(45) Date of Patent: *May 23, 2017

(54) ENHANCED CRUDE OIL RECOVERY USING METAL SILICIDES

(75) Inventors: Paul H. Krumrine, Hanover, PA (US); James S. Falcone, Palm Beach Gardens, FL (US); Michael Lefenfeld, New York, NY (US)

(73) Assignee: SIGNA CHEMISTRY, INC., New York, NY (US)

( * ) Notice: Subject to any disclaimer, the term of this patent is extended or adjusted under 35 U.S.C. 154(b) by 302 days.

This patent is subject to a terminal disclaimer.

(21) Appl. No.: 14/126,187

(22) PCT Filed: Jun. 14, 2012

(86) PCT No.: PCT/US2012/042482
§ 371 (c)(1),
(2), (4) Date: Mar. 28, 2014

(87) PCT Pub. No.: WO2012/174255
PCT Pub. Date: Dec. 20, 2012

(65) Prior Publication Data
US 2014/0196896 A1    Jul. 17, 2014

Related U.S. Application Data

(60) Provisional application No. 61/496,881, filed on Jun. 14, 2011.

(51) Int. Cl.
C09K 8/584       (2006.01)
C09K 8/64        (2006.01)
(Continued)

(52) U.S. Cl.
CPC ............... *E21B 33/14* (2013.01); *C04B 7/02* (2013.01); *C09K 8/46* (2013.01); *C09K 8/58* (2013.01);
(Continued)

(58) Field of Classification Search
CPC ....................................................... C09K 8/64
See application file for complete search history.

(56) References Cited

U.S. PATENT DOCUMENTS 3,097,694 A    7/1963   Kerver
3,482,636 A   12/1969   Crowe
(Continued)

FOREIGN PATENT DOCUMENTS

| | | |
|---|---|---|
| CN | 101395340 A | 3/2009 |
| WO | 2007/098606 A1 | 9/2007 |
| WO | 2012174255 A1 | 12/2012 |

OTHER PUBLICATIONS

SiGNa. Silicides for Oil Field Applications.*
(Continued)

*Primary Examiner* — Doug Hutton, Jr.
*Assistant Examiner* — Avi Skaist
(74) *Attorney, Agent, or Firm* — J.A. Lindeman & Co., PLLC

(57) ABSTRACT

Enhanced oil recovery techniques include introduction of alkali metal silicides into subterranean reservoirs to generate hydrogen gas, heat, and alkali metal silicate solutions in situ upon contact with water. The alkali metal silicides, such as sodium silicide, are used to recover hydrocarbons, including heavier crudes where viscosity and low reservoir pressure are limiting factors. Hydrogen, which is miscible with the crude oil and can beneficiate the heavier fractions into lighter fractions naturally or with addition of catalytic materials, is generated in-situ. It. Heat is also generated at the reaction site to reduce viscosity and promote crude beneficiation. The resulting alkaline silicate solution saponifies acidic crude components to form surfactants which emulsify the crude to improve mobility toward a production well. The silicate promotes profile modification passively via con-
(Continued)

Comparison of various in situ hydrogen generating materials/methods sumptive reactions or actively via addition of acidic gelling agents.

25 Claims, 4 Drawing Sheets

(51) Int. Cl.
*E21B 33/14* (2006.01)
*C09K 8/58* (2006.01)
*E21B 43/24* (2006.01)
*C04B 7/02* (2006.01)
*C09K 8/46* (2006.01)
*E02D 3/12* (2006.01)
*E21B 33/138* (2006.01)

(52) U.S. Cl.
CPC ............. *E02D 3/12* (2013.01); *E21B 33/138* (2013.01); *E21B 43/24* (2013.01); *E21B 43/2408* (2013.01)

(56) References Cited

U.S. PATENT DOCUMENTS

| | | | |
|---|---|---|---|
| 3,690,376 A | 9/1972 | Zwicky et al. | |
| 3,707,386 A | 12/1972 | Kurz | |
| 3,804,643 A | 4/1974 | Arita et al. | |
| 3,826,658 A | 7/1974 | Nicholas | |
| 4,020,027 A | 4/1977 | Nicholas et al. | |
| 4,085,799 A | 4/1978 | Bousaid et al. | |
| 4,147,615 A | 4/1979 | Leas | |
| 4,718,490 A | 1/1988 | Uhri | |
| 5,063,967 A | 11/1991 | Stephens | |
| 5,083,615 A * | 1/1992 | McLaughlin | E21B 43/263 149/87 |
| 5,343,941 A | 9/1994 | Raybon | |
| 5,402,846 A | 4/1995 | Jennings et al. | |
| 6,169,058 B1 | 1/2001 | Le et al. | |
| 6,224,793 B1 | 5/2001 | Hoffman | |
| 6,929,865 B2 | 8/2005 | Myrick | |
| 6,981,548 B2 | 1/2006 | Wellington et al. | |
| 7,111,683 B2 | 9/2006 | Nelson et al. | |
| 7,740,068 B2 | 6/2010 | Ballard | |
| 7,811,541 B2 | 10/2010 | Lefenfeld et al. | |
| 7,926,567 B2 | 4/2011 | Harris et al. | |
| 7,946,342 B1 * | 5/2011 | Robertson | C09K 8/58 166/263 |
| 8,007,762 B2 | 8/2011 | Lefenfeld et al. | |
| 8,372,371 B2 | 2/2013 | Lefenfeld et al. | |
| 8,962,536 B2 | 2/2015 | Winslow et al. | |
| 2003/0141064 A1 | 7/2003 | Roberson, Jr. | |
| 2006/0002839 A1* | 1/2006 | Lefenfeld | C01B 3/06 423/344 |
| 2010/0316917 A1 | 12/2010 | Lefenfeld et al. | |
| 2012/0037368 A1 | 2/2012 | Eick et al. | |
| 2013/0068462 A1* | 3/2013 | Pantano | E21B 43/25 166/305.1 |

OTHER PUBLICATIONS

STIC search (dated Jul. 21, 2015).*
STIC search (dated Nov. 18, 2015).*
International Search Report and Written Opinion of PCT Application No. PCT/US2012/047665 dated Jan. 29, 2014.
International Preliminary Report on Patentability of PCT Application No. PCT/US2013/047665 dated Dec. 31, 2014.
International Preliminary Report on Patentability of PCT Application No. PCT/US2012/042482 dated Dec. 17, 2013.
International Search Report of PCT Application No. PCT/US2012/042477 dated Oct. 15, 2012.
International Preliminary Report on Patentability of PCT Application No. PCT/US2012/044277 dated Mar. 25, 2014.
Borchardt, John K. : "In-Situ Gelation of Silicates in Drilling, Well Completion and Oil Production, Shell Development Company," Westhollow Research Center, Houston, Tx.
Cole et al.: "Water Control for Enhanced Oil Recovery," Halliburton Services, Society of Petroleum Engineers of AIME, 1981.
Hower et al.: "Selective Plugging of Injection Wells by In Situ Reactions," Paper presented at Secondary Recovery Symposium in Wichita Falls, Tx, Nov. 19-20, 1956.
Krumrine et al.: "Profile Modification and Water Control With Silica Gel-Based Systems," Society of Petroleum Engineers, Paper presented at the International Symposium on Oilfield and Geothermal Chemistry held in Phoenix, Arizona, Apr. 9-11, 1985.
Resnvold et al.: "Recompletion of Wells to Improve Water-Oil Ratio," Society of Petroleum Engineers, Paper presented at regional meeting Apr. 2-4, 1975.
Singh et al.: "Fused Chemical Reactions: The Use of Dispersion to Delay Reaction Time in Tubular Reactors," Ind. Eng. Chem. Res., vol. 37, pp. 2203-2207, 1998.
Smith et al.: "A Special Selant Process for Subsurface Water Production," Society of Petroleum Engineers, Paper presented at 1978 Rocky Mountain Regional Meeting Apr. 20-21, 1978.
Usaitis, Vytautas: "Laboratory Evaluation of Sodium Silicate for Zonal Isolation," Master's Thesis, University of Stavanger, Stavanger, Norway, Jun. 30, 2011.
Vinot et al.: "Formations of Water-Soluble Silicate Gels by the Hydrolysis of a Diester of Dicarboxylic Acid Solubized as Microemulsions," Paper presented at 60th Annual Technical Conference and Exhibition of the Society of Petroleum Engineers held in Las Vegas, NV Sep. 22-25, 1985.
A Wallace Signa Chemistry, Inc. "Commercialization of Portable Hydrogen [Presentation]," Fuel Cell Seminar, Nov. 2011 [retrieved Oct. 27, 2013]. Retrieved from the Internet: <URL: http://www.fuelcellseminar.com/media/9030/com34-5%20wallace.pdf>; slides 4-5.
International Search Report and Written Opinion of the International Searching Authority for PCT/US2012/42482, mailed Sep. 7, 2012, 10 pages.

* cited by examiner

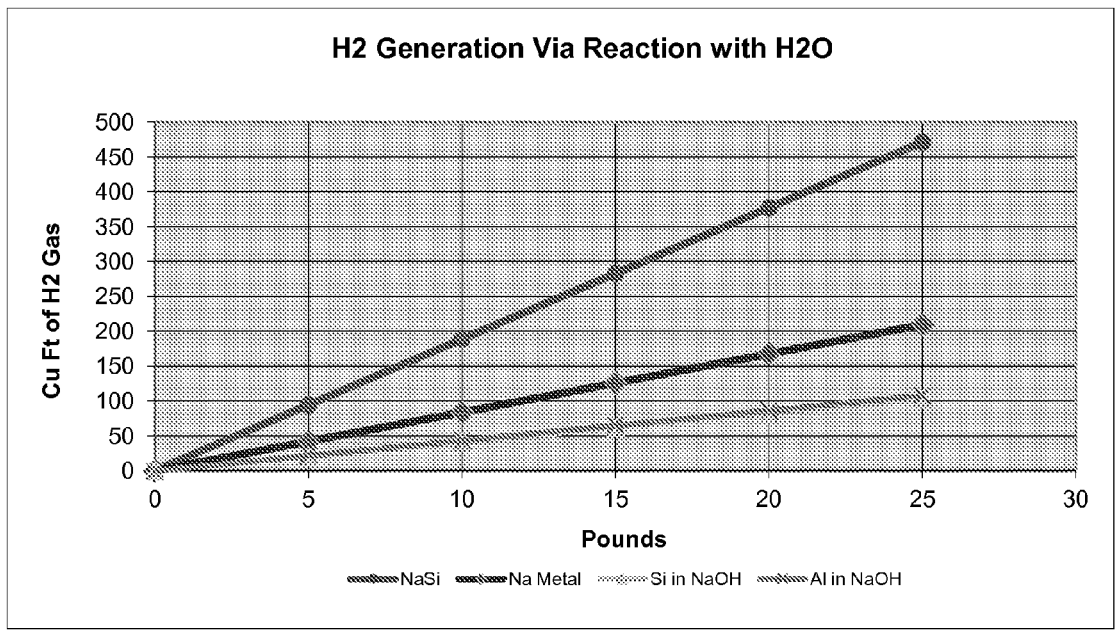
Figure 1. Comparison of various in situ hydrogen generating materials/methods

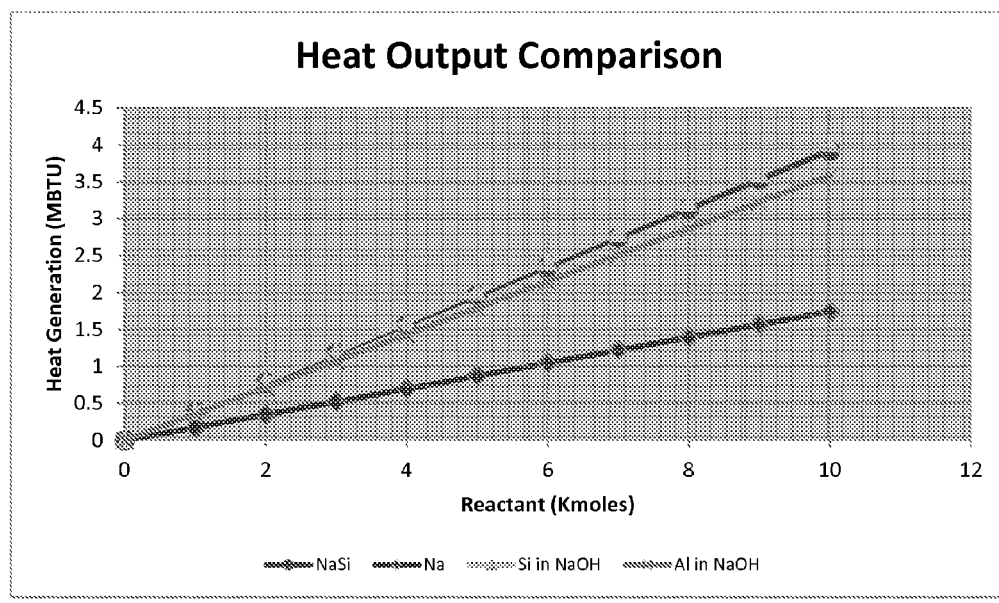
Figure 2. Comparing heat generating ability of sodium silicide vs. sodium metal.

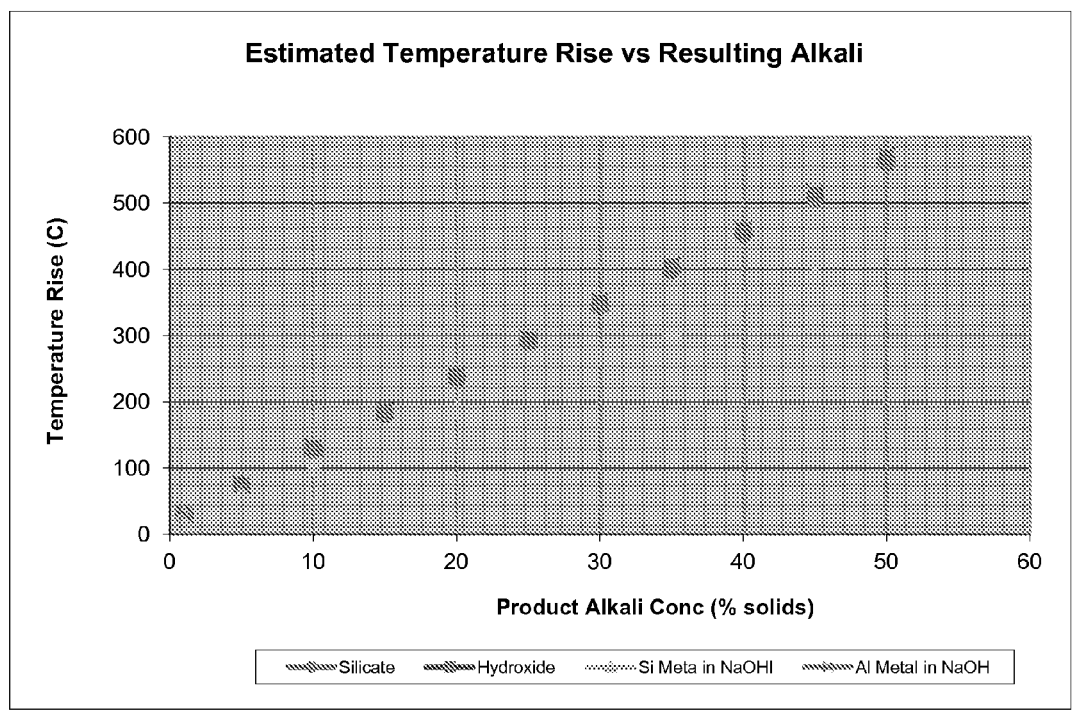
Figure 3. Estimated Temperature Rise vs. Final Concentration of Resulting Alkali Solution

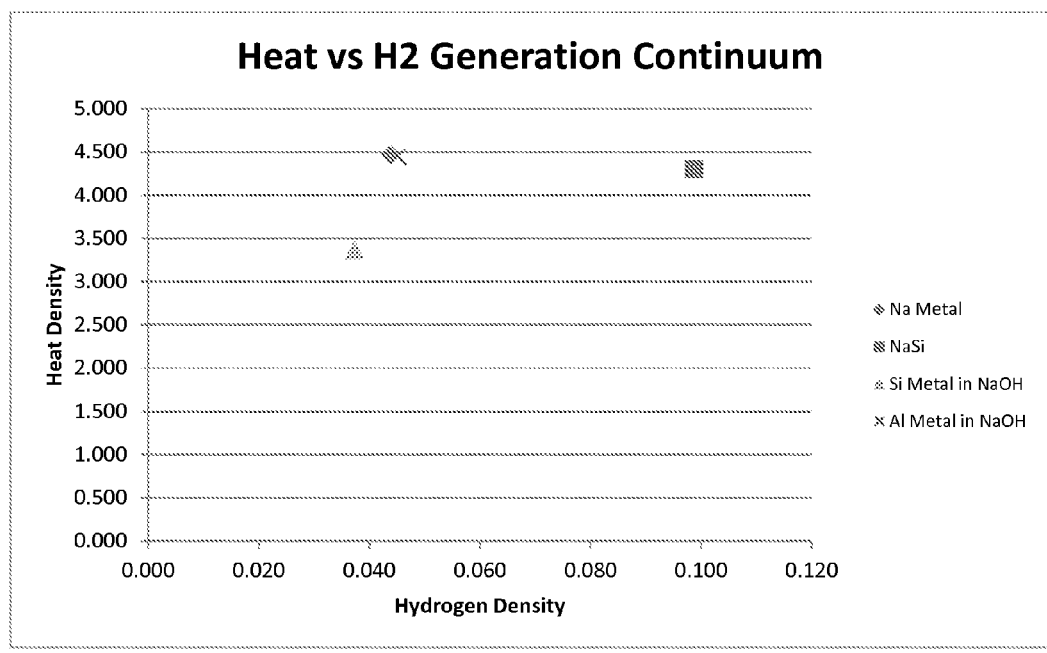
Figure 4. Combined Heat and Hydrogen Generation Capacity Comparison

ENHANCED CRUDE OIL RECOVERY USING METAL SILICIDES

CROSS-REFERENCE TO RELATED APPLICATIONS

This application is a 371 of PCT/US2012/042482 filed on Jun. 14, 2012, which claims priority under 35 USC §119 to U.S. Provisional Application No. 61/496,881, filed Jun. 14, 2011, the entire disclosure of which are both incorporated by reference.

TECHNICAL FIELD

This invention relates to systems and techniques for increasing the amount of crude oil that can be extracted from an oil field. The invention also relates to systems and processes using alkali metal silicides to improve recovery of subterranean hydrocarbon and bituminous material and deposits.

BACKGROUND

In hydrocarbon and bitumen material deposits, such as oil and natural gas deposits, a significant fraction of the hydrocarbon resource remains unrecoverable even after primary natural pressure depletion production, secondary water flood, or pressure maintenance operations and even after tertiary enhanced techniques. Existing recovery techniques access only a small portion of known heavy crude reserves, with the balance remaining trapped underground. This is particularly true for the heavier crudes and bitumens in the 10 to 20 degree API (American Petroleum Institute) category, where the viscosity of the deposits may range to several poise. The deposits may also have adverse wettability and/or capillary forces preventing efficient recovery efforts. For example, heavy crudes with the higher viscosities make it difficult to push them toward a production well with water-based fluids. The heavier crudes tend to be younger in age and contain appreciable acidic components as determined by the Total Acid Number (TAN) measured via titration with potassium hydroxide (KOH). Also, many of these crudes may be classified as "dead" crudes in that there is little, if any, gas associated with them to provide a natural energy to assist with the recovery efforts.

Chemically enhanced recovery methods that are often employed include alkaline flooding techniques (U.S. Pat. No. 2,288,857, Subkow, 7/42) to react with the acidic components of the crude oil to create surfactants in situ and thereby emulsify a portion of the crude oil resulting in lower viscosity and wettability alteration. Alkaline silicates (U.S. Pat. No. 2,920,041, Meadors, 1/60) have been extensively studied over the years and applied for these purposes. Alkalis may be combined with added surfactants and polymers (U.S. Pat. No. 6,022,834, Hsu et al, 2/00) to improve performance and extend applicability to lighter crudes.

Thermally enhanced recovery technologies have also been used to reduce viscosity so that a greater portion of the crude can be forced to a production well before coning or water breakthrough occurs. These techniques include primarily steam flooding (U.S. Pat. No. 5,626,193, Nzekwu et al, 6/97) as well as, and to a lesser extent, in situ combustion techniques (U.S. Pat. No. 3,566,967, Shelton et al, 3/71). These techniques provide sufficient heat to the reservoir to lower the viscosity of the crude so it can be more easily driven to a production well. Steam is generally limited to shallower reservoirs (less than 3,000 ft) where heat loss to the wellbore and surrounding rock is manageable. Steam may be applied either in a huff-and-puff mode (injecting and producing from the same well) or continuously to drive crude to a dedicated production well.

Horizontal drilling techniques allow contact with a larger cross section of the reservoir such that steam soak via huff-and-puff can be effective. A combination of steam and alkalis in horizontal wells has been proposed (U.S. Pat. No. 4,892,146, Shen, 1/90). In situ combustion is not limited by depth but burns a portion of the recoverable reserves via injection of oxygen to create both heat and carbon dioxide, which is miscible with crude to swell and reduce viscosity.

Miscible technologies primarily include injection of carbon dioxide gas (U.S. Pat. No. 2,875,830, James W. Martin, Mar. 3, 1959), (U.S. Pat. No. 4,589,486, Alfred Brown et al, May 20, 1986) to swell the oil and reduce viscosity, but may include other gases such as hydrogen. Hydrogen is regarded as a less effective swelling agent, since it is on average about 15 times less soluble in crude. However, if the reservoir temperature can be raised above 425° C. (800° F.), there is the possibility for some in situ cracking/hydrogenation reactions (U.S. Pat. No. 2,857,002, E. F. Pevere et al, 10/58) to occur, which will improve the flowability of the crude. This can be further enhanced by injection of suitable catalytic agents.

Hydrovisbreaking (U.S. Pat. No. 6,328,104, Dennis J. Graue, Dec. 11 2001) is the application of hydrogen gas under elevated pressure and temperature to a heavy crude oil or bitumen, which results in a viscosity reduction of the heavy oil or bitumen to a lighter American Petroleum Institute (API) gravity material with reduced viscosity. The hydrovisbreaking process uses combustion units installed in injection wells to burn industrial-grade hydrogen with industrial-grade oxygen. This allows the injection of high-quality steam and hot hydrogen into the hydrocarbon-bearing formation to create the conditions required to promote in situ hydrovisbreaking. This thermal cracking process, involving hydrogenation of the heavy oil or bitumen is usually carried out at the refinery to process the heavy crude or bitumen into products that can be sold. Herron (Experimental Verification of In Situ Upgrading of Heavy Oil, E. Hunter Herron, October 2003) and others have shown that the hydrogenation reaction can be carried out to a significant extent in situ by application of hydrogen and heat. Conditions required were temperatures of 345° C. (650° F.) or greater and hydrogen partial pressure up to 8.7 megapascal (MPa), or 1,275 psia (88 bar). At these conditions, it was observed that viscosity reduction could be up to 99% with gravity increases of 5 to 10 degrees within several days.

Recovery efforts are often subject to widely varying permeability throughout the production zone or to fissures that direct fluids away from intended production wells. This leads to premature breakthrough and can bypass significant amounts of otherwise recoverable oil. Methods to deal with these challenges include various blocking techniques for the very severe channels and profile modification for less severe cases. Blocking methods include injection of cross-linkable organic polymers or other gelling/grouting inorganic agents such as silicates to rapidly form impermeable barriers in the highest permeability channels. Profile modification can be accomplished more gradually over time by deposition and buildup of gelatinous material (U.S. Pat. No. 2,402,588, Andresen, 6/46) in the highest permeability flow channels, thereby diverting fluids to less permeable channels containing oil that had been previously bypassed. Aqueous slugs of silicates alternating with multivalent cation salts (U.S. Pat. No. 4,081,029, Holm, 3/78) build precipitates in the primary channels to divert fluids. Also, gelatinous silicate precipitates may help to stabilize unconsolidated sands, thereby preventing unwanted production of sand.

Despite the existence of these techniques, large heavy crude reserves remain largely untapped, and these recovery methods add significant cost per barrel of recovered oil. These current enhanced oil recovery techniques often produce large quantities of brine at the surface, which can contain toxic metals and pose a threat to water sources if not properly contained.

SUMMARY

The method of the claimed invention includes reacting alkali metal silicides with water in subterranean formations in order to enhance recoverability of hydrocarbons and bituminous materials from within the formation. The alkali metal silicide reacts rapidly and completely upon contact with water to release hydrogen and heat and produces an alkali metal silicate solution, all of which can contribute to energizing the reservoir and reducing crude oil viscosity thereby allowing the crude oil to be effectively driven to and/or collected at a production well.

The claimed invention utilizes a metal silicide composition of matter that produces significant amounts of heat, hydrogen gas, and a metal silicate solution upon contact with water. The combination of reaction products enhances the recovery of crude oil. For example, one metal silicide that can be used in the claimed invention is a calcium silicide. The composition metal silicide material can be a solid such as a powder but converts completely and rapidly to a solution upon contact with greater-than-stoichiometric-quantities of water. Metal silicides can be useful in generating hydrogen and heat and can be useful in profile modification applications.

The claimed invention also utilizes an alkali metal silicide (such as disclosed in U.S. Pat. No. 7,811,541, Lefenfeld et al, 10/10, which is hereby incorporated by reference in its entirety for all purposes) that rapidly produces significant amounts of heat, hydrogen gas, and an alkali metal silicate solution upon contact with water. The combination of reaction products provides great flexibility for the enhancement of crude oil recovery processes. Example embodiments of the claimed invention utilize alkali metal silicides of the alkali metal group consisting of lithium (Li), sodium (Na) and potassium (K). For example, several example compositions including lithium silicide ($Li_{12}Si_7$), sodium silicide ($Na_4Si_4$), and potassium silicide ($K_4Si_4$) can be utilized in methods of the claimed invention to improve the recovery of subterranean hydrocarbon and bituminous deposits. For example, sodium silicide, consisting of isolated $(Si_4)^{4-}$ tetrahedral anions, can be effectively used to access heavy crude reserves due to its lower cost and performance advantages. Upon reaction with water, sodium silicide produces sodium silicate, hydrogen gas, and heat. Additionally, potassium silicide can be used in the presence of swelling clays where loss of fluid permeability can be a concern. Potassium ion tends to reduce the swelling and expansion of the clay layers. Although the remainder of the discussion focuses on systems and methods of the sodium forms of the alkali metal silicide composition as illustrative examples, other alkali metal versions of silicide (as well as other metal versions of silicide) can also be used effectively in the invention in oil field applications and are included in the scope of the claimed invention. Mixtures of metal silicides may be used as the metal silicide in the invention. Included within such mixtures are combinations of metal silicides as well as mixed metal silicides. That is, the metal in the metal silicide can be an individual metal (e.g., Ca, Na, K) or the metal can be a combination of metals (e.g., Ca and Na; Na and K; Ca, Na, and K)—a mixed metal silicide. Mixtures of all such silicides can be used.

The alkali silicide utilized in the claimed invention is preferably a solid initially but converts completely and rapidly to a solution upon contact with greater-than-stoichiometric-quantities of water. The rate of reaction is proportional to particle size and corresponding surface area.

The alkali metal silicide is delivered downhole through a well where the heat and the hydrogen generated in the reaction is immediately available to producing zones of the reservoir. This avoids potential heat loss during transit down the well string. To accomplish this delivery, various techniques can be employed within the scope of the claimed invention to prevent premature water reaction. For example, these techniques include encapsulating the alkali metal silicide in a water resistant coating, utilizing a non-reactive hydrocarbon carrier fluid with spacer slugs, or utilizing dual injection strings to prevent mixing until the productive zone of the oil reserve is reached. Additionally, the alkali metal silicide can be delivered in a non-aqueous carrier fluid to the production zone where natural mixing with reservoir fluids or subsequent injection of an aqueous slug can begin the reaction. Addition of appropriately sized non-aqueous spacer slugs can prevent premature reaction until the silicide has penetrated the desired distance into the formation. Other methods of preventing premature reaction would also fall within the scope of the claimed invention. Combinations of these techniques can also be used to delay and control the silicide reaction with water until the composition reaches the location within the productive zone of the reserve where it can provide the maximum benefit.

The reaction products of this invention are soluble silicates, which can be used in water treatment applications due to their ability to precipitate and lower the activity of multivalent metal cations. An aqueous solution of an alkali metal silicate is alkaline and can be termed "an alkaline silicate solution." The silicate reaction product is one component of the solution. Generating sodium silicate in situ through reaction with reservoir brine creates an alkali metal silicate that is well suited to alkaline flooding and profile modification. An example of the generated alkali metal silicate has the consistency of "liquid rock or sand." This is the ratio that is achieved commercially via reaction of sand and caustic in an autoclave process, representing a quasi-equilibrium state. This liquid rock minimizes further undesirable reactions with reservoir minerals. There is sufficient alkalinity and pH to promote formation of in-situ surfactants, which form from reacting the alkali metal silicide with acidic hydrocarbons in the crude oil (hydrocarbon) or bituminous material deposit. The neutralized molecule then has a hydrophilic ionic end and a hydrophobic hydrocarbon end. That is, it is a surfactant and wants to partition between the oil and water phases. The surfactants that form vary in molecular weight and composition depending on the type of acidic components are present. The surfactants can affect wettability, promote emulsification of the crude, and can be foaming agents as gas is generated. As the alkalinity is consumed and the pH falls, or through reaction with multivalent cations, polymeric and colloidal silicate species are deposited in the higher permeability channels. This provides profile modification and sweep improvement. The formed surfactants also lower interfacial tension (IFT) and promote emulsification of the crude oil, which lowers viscosity and aids in the formation of an oil bank that can be propagated toward a producing well. These mechanisms are also present in an alkaline flood.

The system of the claimed invention for recovering hydrocarbon or bituminous deposits from a reserve formation includes a silicide injection pump for depositing a metal silicide or an alkali metal silicide in the hydrocarbon or bituminous deposit. For example, the metal silicide or alkali metal silicide can be delivered in a fluid medium downhole as a slurry using the silicide injection pump. Additionally, the system can include an injection well for reacting the metal silicide or the alkali metal silicide with water to generate hydrogen gas, heat, and an alkali metal silicate that reduces the viscosity of the hydrocarbon or bituminous deposit. The injection well can be physically separate from a production well, or can be integrated in the production well, depending upon the location of the hydrocarbon or bituminous deposit. Likewise, the system can also include a well, such as a production well, for example, for recovering the lower viscosity hydrocarbon or bituminous deposit.

BRIEF DESCRIPTION OF THE DRAWINGS

FIG. 1 illustrates a comparative analysis of hydrogen generating capability for sodium silicide with water, sodium metal with water, silicon metal reaction with sodium hydroxide, and aluminum with sodium hydroxide.

FIG. 2 shows a comparison of heat generation capacity of sodium silicide in accordance with the claimed invention versus sodium metal.

FIG. 3 illustrates a comparison of the expected temperature rise for resulting alkali solutions as a function of excess water.

FIG. 4 shows comparative heat and hydrogen capacities for selected enhanced crude oil recovery techniques including the use of sodium silicide in accordance with the claimed invention.

DETAILED DESCRIPTION

The claimed invention includes the application of alkali metal silicides for the recovery of viscous crude oils from subterranean formations. The alkali metal silicide is a powder or other solid for anticipated reservoir applications, and it reacts rapidly and completely upon contact with water to release hydrogen and heat, and results in an alkaline silicate solution. The hydrogen, heat, and alkali metal silicate solution produced contribute to energizing the reservoir and reducing crude oil viscosity so that the crude oil can be effectively driven and collected at a suitable removal point, such as at a production well.

Alkali Metal Silicides

Alkali metal silicides that can be utilized in the systems and methods of the claimed invention are described in U.S. Pat. No. 7,811,541, which is incorporated here by reference in its entirety. Alkali metal silicides include the silicides of lithium, (Li); sodium, (Na); potassium, (K). Mixtures of alkali metal silicides can be used as the metal silicide in the invention. Included within such mixtures are combinations of metal silicides as well as mixed metal silicides. That is, the metal in the alkali metal silicide can be an individual alkali metal (e.g., Li, Na, K) or the alkali metal can be a combination of metals (e.g., Ca and Na; Na and K; Ca, Na, and K)—a mixed alkali metal silicide. Mixtures of all such alkali metal silicides can be used.

Preferred alkali metal silicides are available from SiGNa Chemistry, Inc. of New York, N.Y. They are generally free-flowing powders that may be easily handled in dry air. These alkali metal silicides do not react with oxygen and only slowly absorb water from the atmosphere and without ignition. In one embodiment of the invention, the alkali metal silicide is a sodium silicide (preferably having a 1:1 Na:Si molar ratio) or a potassium silicide (preferably having a 1:1 K:Si molar ratio). As illustrated by the chemical equation [1] for $Na_4Si_4$, alkali metal silicides react with water to produce hydrogen gas, the corresponding alkali metal silicate, and heat. Embodiments of the invention utilize sodium silicide, ($Na_4Si_4$), or a potassium silicide, ($K_4Si_4$). As illustrated by the following chemical equation for $Na_4Si_4$, alkali metal silicides react with water to produce hydrogen gas, the corresponding alkali metal silicate, and heat.

$$Na_4Si_4(s)+5H_2O(l) \rightarrow 5H_2(g)+2Na_2Si_2O_5(s)+\text{energy} \quad [1]$$

This reaction proceeds smoothly at room temperature and without the need of a catalyst.

In a system and method for enhanced crude oil recovery, the alkali metal silicide reacts with greater-than-stoichiometric quantities of water in the reserve deposit. The release of hydrogen gas dissolves into the heavy crude it contacts, thereby lowering viscosity to make the crude easier to displace. The rapid evolution of hydrogen also creates a viscous foam phase that displaces the oil by raising the pore pressure. Likewise, the released hydrogen gas creates pressure in the well, which forces the crude oil toward the collection point. As outlined above, the production of the corresponding alkali metal silicate provides profile modification, sweep improvements, favorable wettability and reduced interfacial tension, all of which contribute to forcing crude oil toward the collection point. Both the hydrogen gas and the alkali metal silicate are formed in situ.

The energy created by the reaction above is heat energy that serves to reduce the viscosity of the crude oil reserve. For example, the exact stoichiometric reaction is as follows:

Sodium silicide to sodium disilicate $$2NaSi(s)+5H_2O(l) \Rightarrow Na_2Si_2O_5(aq)+5H_2+827 \text{ kJ} \quad [2]$$

The heat of reaction is estimated based upon the individual heats of formation, with $Na_2Si_2O_5$ being $Na_2O$ and $2:SiO_2$. A value of −126 kJ/mol is assumed for NaSi as the average value obtained by differential scanning calorimetry (DSC) for the heat of reaction of Na with Si. As can be seen from the above reaction [2], both the Na metal and the Si metal portions of the sodium silicide contribute to the formation/liberation of hydrogen. Sodium yields one $H_2$ molecule, and silicon yields four $H_2$ molecules.

Utilization of alkali metal silicides in the systems and methods of the claimed invention is superior to other potentially cost-effective in situ hydrogen and heat generation systems such as Na metal alone (U.S. Pat. No. 4,085,799, Bousaid, 4/78) or Si metal dissolved in NaOH (U.S. Pat. No. 4,634,540, Ropp, 1/87) or Al metal dissolved in NaOH (U.S. Patent 2009/0252671A1, Fullerton, 10/09). The corresponding prior stoichiometric reactions for these systems are as follows:

Na Metal in Water to sodium hydroxide $$2Na(s)+2H_2O(l) \Rightarrow 2NaOH(aq)+H_2(g)+366.6 \text{ kJ} \quad [3]$$

Si Metal in sodium hydroxide to sodium metasilicate $$Si(s)+2NaOH(aq)+H_2O \Rightarrow Na_2SiO_3(aq)+2H_2(g)+423.8 \text{ kJ} \quad [4]$$

Al Metal in sodium hydroxide to sodium aluminate

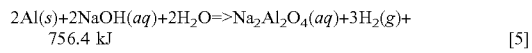

[5]

Coatings and Delivery

The alkali metal silicide is delivered downhole where all of the heat and the hydrogen generated can be available to producing zones of the reservoir. To accomplish this, various methods can be employed to prevent premature water reactions. As examples, these methods include encapsulation of the alkali metal silicide in a water resistant coating (see example, U.S. Pat. No. 7,946,342, Eric P. Robertson, 5/11), use of a non-reactive hydrocarbon carrier fluid with spacer slugs alone (see example, U.S. Pat. No. 4,085,799, Bousaid, 4/78), and use of dual injection strings to prevent mixing until the productive zone is encountered. Combinations of these techniques can also be used to delay and control the silicide reaction with water until the composition reaches the location of the reserve where it will be most beneficial.

Short term coatings utilized in the systems and methods of the claimed invention are ultimately soluble in water and can include materials such as sugar, starch, urea, gelatin and various water soluble polymers. Coating thickness can be controlled to allow sufficient time for the silicide to traverse the wellbore to the production zone or could be delivered via a dual string injection system, whereby the coating begins to dissolve and degrade upon reaching the productive zone. The size of the alkali metal silicide particles utilized in one method, such as the sodium silicide particles, can be reservoir-specific, based on a number of factors, including permeability of the reservoir materials. For example, in one example embodiment of the claimed invention, the sodium silicide particles are smaller than 15 microns. In another example embodiment of the claimed invention, the particle size can be smaller than 1 micron. The size of the particles can be tailored to the specific reservoir to facilitate penetration of the materials into the reservoir formation. For example, materials such as unconsolidated sand formations, or sandstones, often have permeability measures of greater than 1 darcy ($\approx 1 \times 10^{-12}$ m$^2$).

Another example of a coating material that can be utilized in example embodiments of the claimed invention includes various thermal-controlled-melt waxes or crystallizable or thermoplastic polymers (see example, U.S. Pat. No. 6,224,793, Dwight K. Hoffman, 5/01). Such materials can be designed and tailored to the particular reservoir temperature so that softening and coating breakdown is naturally triggered upon reaching temperature at reservoir depth. Alternatively, the coating can be designed to be just above the natural reservoir temperature so that a follow on shot of fluid at sufficient temperature triggers the breakdown. Once a portion of the injected silicide begins to react there will be sufficient heat generated to propagate the reaction throughout the injected silicide slug.

Another example embodiment of the claimed invention utilizes coating materials that can allow deeper formation penetration and can be biologically degraded by microbes over time. These coatings can include either hydro-biodegradable plastics (HBP) or oxo-biodegradable plastics (OBP). A polyester coating is one example of an HBP that has a hydrolysable ester bond, which is suitable for use in the claimed invention. An example of an OBP type coating suitable for use in the claimed invention includes a small amount of a transition metal such as iron, manganese, cobalt or nickel to speed up the biodegradation of plastics such as polyethylene (PE), polypropylene (PP) and polystyrene (PS). An OBP is a longer term form of protection since the degradation rate is less than an HBP by roughly a factor of 10. Reservoirs have a variety of in situ microbes or specific non-native microbes can be injected to facilitate the coating degradation. The microbes can be stimulated by addition of nutrients and/or oxygen to degrade the coatings.

Further, various plastic coatings can be softened or swelled upon contact with solvents such as alcohols, acetone, gasoline or lighter hydrocarbon fractions. These solvents may be present either in the native crude or can be injected subsequent to the coated silicide application to release and promote the reaction with water.

Coatings can be designed to delay and control the silicide reaction with water until the silicide reaches the location within the productive zone where it can provide the maximum benefit.

As outlined above, the alkali metal silicide can be delivered in a non-aqueous carrier fluid to the production zone where natural mixing with reservoir fluids or subsequent injection of an aqueous slug will initiate the reaction. Addition of appropriately sized non-aqueous spacer slugs can prevent premature reaction until the silicide has penetrated the desired distance into the formation. This obviates the need for a coating that adds to the silicide particle size, which can be a limiting factor for some of the tighter reservoir matrices.

The alkali metal silicide delivery mode utilized can also be chosen in part by the production mode employed. For example, a frontal advancement drive that moves the front of the hydrocarbon or bituminous material deposit via continuous or sequential slugs can be employed or a huff-and-puff operation (cyclic steam injection process) from the same wellbore can also be used depending upon the particular crude and reservoir characteristics. If alkaline flooding and resultant formation of in situ surfactants and emulsification is the primary enhancement mechanism, then a continuous slug drive may be preferred. If profile modification is the primary mechanism, then sequential slugs may provide advantages for better deposition control in the primary flow channels. If the heat and hydrogenation potential are the primary mechanisms then a huff-and-puff approach may be warranted initially, but followed after several cycles by a subsequent drive mode. The salinity of the slug can be designed to obtain the optimum partitioning such that IFT is minimized. The surfactants can contribute to all of the above mechanisms. They can affect wettability, promote emulsification of the crude, and can be a foaming agent as the gas is generated.

In one example embodiment, the claimed invention can be applied in a huff-and-puff scenario with injection and production from the same well, after a brief shut-in (soak) period to allow dissipation of the hydrogen, heat, and alkali metal silicate solution into the crude. This approach works well for a horizontal well that maximizes contact with the productive zone. A horizontal well placed near the bottom of the productive zone leverages the natural gravity effects. Heat and hydrogen dissipate into the productive zone above the injection well. After a short soak period, when switched over to production mode, the horizontal well allows for contacted crude that now is at a lower viscosity to drain, to be collected, and to be produced. Several cycles of this technique can provide savings before switching over to a drive mechanism. Likewise, in tighter formations where permeability can limit the amount and size of solids that can penetrate the formation, huff-and-puff techniques are also effective. For example, even a smaller penetration of the reserve or a reaction largely in the wellbore can yield improved production results.

If the productive zone is thick (100 ft or more), a second horizontal production well can be located above the injection well for a pure drive mechanism. This configuration allows the heat, hydrogen, and alkali metal silicate solution to rise and drive with it the beneficiated low-viscosity crude oil emulsion. Alternatively, for vertical wells, the various pattern drives can be employed to move reacted crudes from injector to producer.

Fracking and directional drilling enhance access to more of the reservoir through a single well making these unconventional reserves and tight formations economical to produce. Fracking applies high pressure to split open the formation rock to create large channels in which fluids can flow. During the fracking process, proppants are placed in the channel to hold it open. An enrobed sodium silicide can be placed as part of the proppant package and thereby allow the sodium silicide material to penetrate deeper into the formation before reacting. These high permeability channels can then be used for follow on injection to deliver silicide deeper into the formation.

In another example embodiment of the claimed invention, alternating short slugs of silicide/carrier fluid and water can be injected to generate a series of reacting fronts through the reservoir. The water slugs can contain catalytic agents to promote hydrogenation reactions for beneficiation of the heavy crude and/or precipitating agents such as multivalent metal cations to deposit siliceous precipitates in higher flow channels. Examples of catalysts can include rhodium, palladium or platinum as well as gas phase catalysts such as methyl iodide or nickel carbonyl (see example, U.S. Pat. No. 3,102,588, Henry B. Fisher, Sep. 3, 1963). Examples of multivalent metal cations are salts of Ca, Mg, Fe, Ti, Al, and the like. Also, exposure of the heavy crude to a nanocatalyst and reducing agent like hydrogen can also be employed (see example, U.S. Pat. No. 7,712,528, John E. Langdon, 5/10).

As outlined above, the system of the claimed invention for recovering hydrocarbon or bituminous deposits from a reserve formation can include a silicide injection pump for depositing a metal silicide or an alkali metal silicide in the hydrocarbon or bituminous deposit. For example, the metal silicide or alkali metal silicide can be injected downhole as a slurry with the silicide injection pump in the reserve deposit independently or following a preflush. The metal silicide or alkali metal silicide can then react with water to generate hydrogen gas, heat, and an alkali silicate that reduces the viscosity of the hydrocarbon or bituminous deposit. The reaction can occur in the wellbore, in an injection well, or in the reserve deposit itself. The injection well can be physically separate from a production well, or can be integrated in the production well, depending upon the location of the hydrocarbon or bituminous deposit. The system can also include a well, such as a production well, for example, for recovering the now lower viscosity hydrocarbon or bituminous deposit.

Hydrogen Generation

In an example embodiment of the claimed invention, prior techniques of generating in situ hydrogen and heat could be employed in conjunction with the improved performance provided by sodium silicide to extend or provide the benefits over a longer time frame. For example, the reaction rates of both Si and Al metal with caustic and consequent evolution of hydrogen is much slower in comparison to either sodium silicide or sodium metal. Also, the in situ generation of an amorphous aluminate in conjunction with the silicate provides the precursors for zeolite formation and is beneficial in promoting the hydrovisbreaking reactions. Al metal in NaOH can be employed as the initial slug in a sequence of subsequent sodium silicide slugs due to the longer reaction timeframe. As the reactant slugs disperse in the formation, the conditions for zeolite precursors to form are achieved. Concentrations can be modeled and controlled to provide a measure of profile modification due to particulate formation. Combinations of these various prior techniques with the reaction of an alkali metal silicide and water to enhance recovery fall within the scope of the claimed invention.

FIG. 1 demonstrates the superior ability of NaSi for generation of hydrogen gas compared to previous techniques. As can be seen, sodium silicide generates 2.25 times more hydrogen than sodium metal, and 3.5 times more hydrogen than silicon or aluminum metal dissolved in NaOH when compared on an equal weight basis of reactants.

Heat Generation

As outlined above, significant heat is also generated from the reactions of alkali metal silicides and water. Crude oil hydrogenation/cracking reactions begin to occur beyond about 325 to 350° C. Such reactions can result in partial beneficiation and a lower molecular weight distribution (hydrovisbreaking) for the crude oil with resulting lower crude viscosity or pour point. The heats of reaction are included in the preceding comparative chemical reaction details in equations [3, 4, and 5] above. FIG. 2 shows a comparison of the number of moles of reactant required to generate a given quantity of heat. On a mole basis, about 44% fewer moles of sodium silicide are required to generate the same quantity of heat as sodium metal. Although dissolution of Si or Al metal can generate comparable heat, it is a much more gradual heating that is more readily dissipated into the reserve formation. As such, it is less likely to contribute to hydrovisbreaking in the vicinity of the reaction point. It is also dependent upon competing reactions from the formation that can deplete the alkalinity before it has a chance to dissolve the Si or Al.

FIG. 3 shows the expected temperature rise resulting from an embodiment of the method of the claimed invention in the immediate vicinity of the reaction site for the resulting alkali solutions as a function of the amount of excess water added. FIG. 3 compares the temperature rise of sodium disilicate [2] (sodium silicide/water), sodium hydroxide [3] (sodium metal/water), sodium metasilicate [4] (Si metal in NaOH), and sodium aluminate [5] (Al metal in NaOH) as a function of amount of excess water added. That is, there are greater-than-stoichiometric amounts of water in the reaction. Excess water dilutes the concentration of the effective alkali and heat much as would be expected to occur over time in the reservoir. This temperature rise estimate only accounts for the water phase and does not factor in heating of the reservoir rock or crude oil. Also, the temperature rise estimate incorporates sufficient reservoir pressure to keep the water as a liquid phase. If the pressure is too low to keep the water as a liquid, some water may flash off as steam. The reactions for sodium silicide, sodium metal and Al dissolution in NaOH all result in about the same temperature rise. However, the rate of reaction is considerably slower for Al metal dissolution in NaOH. Although the sodium silicide releases more heat per gmole, its higher molecular weight for the resulting reactant makes it equivalent to sodium metal when viewed in terms of the resulting reaction products. In either case, the expected temperature rise indicates that in the general vicinity of the sodium silicide/water reaction there is sufficient heat and hydrogen for hydrovisbreaking reactions to occur and enable improved crude oil recovery.

FIG. 4 displays the combined effects of hydrogen and heat in an XY plot to show the advantages of utilizing sodium silicide as an example of an alkali metal silicide to improve heavy crude recovery potential in accordance with the claimed invention. These heat and hydrogen values are expressed as pseudo densities. The heat density is defined as the amount of heat available via the stoichiometric reaction products or kJ/gram of products. The hydrogen density is defined as the amount of hydrogen available via the solid reactants, that is, excluding any water. Water is excluded because the reaction ultimately includes a solution of varying concentration in the reservoir environment. The solid reactants are purchased and pumped downhole. As shown in FIG. 4, materials with higher hydrogen density and heat density (upper right corner of graph in FIG. 4) are superior and provide more energy to the reservoir either directly via heat released, or indirectly via pressurization of the reservoir.

Alkali Metal Silicate Solution

In addition to the hydrogen generation and heat of reaction, the resultant solution from the method of the claimed invention is used for enhanced oil recovery performance as well. For example, sodium silicide reacts completely with water to form a multimeric 2.0 mole ratio sodium silicate. Sodium metal reacts to form a sodium hydroxide solution. Dissolving Si metal in sodium hydroxide can yield a variety of alkaline silicate solutions depending on proportions, but the most likely species are a monomeric sodium orthosilicate or metasilicate for stoichiometric purposes. The driving force for continued dissolution of Si metal to higher ratios decreases as the concentration in solution increases.

These are strong alkalis with sodium hydroxide being the strongest. A 1% sodium hydroxide solution has a pH value of about 13.1. An orthosilicate is only a little less at a pH value of 12.9, while a 2.0 mole ratio sodium silicate has a pH value of about 11.85. They are sufficient to react with acidic crude components to generate surfactants in situ, but injection of dissolved silicates can avoid the normal dissolution reactions (see example, U.S. Pat. No. 4,458,755, Southwick et al, 7/84). The buffered 2.0 mole ratio sodium silicate is less aggressive toward the reservoir matrix, thereby leading to less of the non-productive consumptive alkali reactions over time.

In a reservoir environment where the oil bearing zone is made up of sand (silica), clays (aluminosilicates) and various other minerals (calcite, gypsum, siderite, etc.), a high pH value tends to promote consumptive reactions. Reactions with aluminosilicate clays and other reservoir minerals tend to convert clays and minerals to a sodium-enriched form, thereby depleting alkalinity reserves. The higher the pH value, the more readily and completely these non-productive reactions occur. High reservoir temperatures also increase alkali reaction kinetics, often limiting alkali application to reservoirs less than 150° F. For example, in these high temperature reservoirs, an alkaline flood may not survive for a period of time long enough to be effective. The alkali can be depleted by non-productive reactions with reservoir minerals and clays rather than by reaction with the crude oil acids. In that case, insufficient surfactants would be generated. In the claimed invention, the use of a metal silicide or alkali metal silicide generates heat and hydrogen in the reserve deposit formation. The benefit of the reaction is greatest in the immediate vicinity of the reaction, and the alkali does not necessarily have to survive a long period of time to affect collection of the hydrocarbon or bituminous deposit. In a caustic or sodium hydroxide environment, the hydroxide dissolution of sand (crystalline $SiO_2$) produces silicates in situ. Over time, a quasi-equilibrium lower pH value state will be achieved at about a 2.0 to 2.4 ratio silicate. On the other hand, sodium silicide reaction with water naturally results in this "liquid rock" quasi-equilibrium state, thereby partially avoiding the high pH value consumptive reactions experienced in a purely caustic environment resulting from sodium metal application.

Reservoir brine hardness (resulting from multi-valent cations) is detrimental to surfactant and polymer performance. Reservoir clays act as natural ion-exchangers to feed hardness back into whatever fluid is flowing through the reservoir. Sodium hydroxide lowers the activity of these hardness ions, but sodium silicate can lower it by two additional orders of magnitude at the same pH value. The resulting silicates from the reaction of the alkali metal silicides and water serve to minimize detrimental effects of the reservoir brine hardness. The reduced activity of hardness ions by alkalis in combination with natural silica polymerization into colloids as alkali is depleted results in precipitate formation in the reservoir. This silicate precipitation and colloid deposition in the higher flow channels is a method of profile modification (see examples, U.S. Pat. Nos. 3,871,452 & 3,871,453, Sarem, 3/75). It results in a moderate flow diverting agent so that chemicals/surfactants and the emulsified oil flow more readily into and through the capillaries and tighter oil zones that had been largely bypassed during any prior secondary (water flooding) recovery efforts.

Injected sodium hydroxide used in alkaline flooding eventually produces a silica rich solution by dissolution of reservoir sand grains, but the effect is delayed compared to direct injection of a silicate solution. That is, sodium hydroxide leads to more non-productive consumption of the available alkali compared to alkali metal silicides such as sodium silicate, for example. The high pH value of hydroxide tends to consume alkalinity at an increased rate until a quasi-equilibrium dissolved silica state is reached and as a result provides less protection against the natural hardness resulting from the reservoir brine and clays.

The claimed invention applies alkali metal silicides, including sodium silicide, to the recovery of viscous crude oils from subterranean formations. The alkali metal silicides can be powders and solids that react rapidly and completely upon contact with water to release hydrogen and heat, and results in an alkali metal silicate solution, all of which contribute to energizing the reservoir and reducing crude oil viscosity so that the crude oil can be effectively driven to and collected at a production well.

What is claimed is:

1. A method of recovering hydrocarbon or bituminous material from a subterranean reservoir comprising:
    depositing an alkali metal silicide or a mixture of alkali metal silicides in the reservoir; and
    reacting the alkali metal silicide or the mixture of alkali metal silicides with water to generate hydrogen gas, heat, and an alkali metal silicate that collectively enhance recovery of the hydrocarbon or bituminous material.

2. The method of claim 1, wherein the alkali metal silicide is a sodium silicide.

3. The method of claim 1, wherein the alkali metal silicide is a lithium silicide, a potassium silicide, or mixtures thereof.

4. The method of claim 1, wherein the alkali metal silicide is $Na_4Si_4$.

5. The method of claim 1, wherein the alkali metal silicide is $K_4Si_4$.

6. The method of claim 1 further comprising:
    recovering the hydrocarbon or bituminous material with a well.

7. The method of claim 1 further comprising:
coating the alkali metal silicide to prevent a premature reaction with the water.

8. The method of claim 7 further comprising:
degrading the coating of the alkali metal silicide to allow the alkali metal silicide or mixture of alkali metal silicides to react with water in the reservoir.

9. The method of claim 8, wherein degrading the coating of the alkali silicide or mixture of alkali metal silicides is promoted by at least one of heat, dissolution, or microbial reaction.

10. The method of claim 9, wherein the degrading occurs in the reservoir.

11. The method of claim 1, wherein depositing the alkali metal silicide or mixture of alkali metal silicides includes depositing the alkali metal silicide or mixture of alkali metal silicides into a desired location in the reservoir with a non-reactive hydrocarbon carrier fluid.

12. The method of claim 1, wherein depositing the alkali metal silicide or mixture of alkali metal silicides includes depositing the alkali metal silicide or mixture of alkali metal silicides into a desired location in the reservoir with hydrocarbon spacer fluids.

13. The method of claim 1, wherein depositing the alkali metal silicide or mixture of alkali metal silicides includes depositing the alkali metal silicide or mixture of alkali metal silicides in the reservoir on a continuous basis.

14. The method of claim 1, wherein depositing the alkali metal silicide or mixture of alkali metal silicides includes depositing the alkali metal silicide or mixture of alkali metal silicides in the reservoir through a series of alternating slugs.

15. The method of claim 11 or 12 further comprising:
recovering the hydrocarbon or bituminous material to a producing well.

16. The method of claim 1, further comprising:
depositing the alkali metal silicide or mixture of alkali metal silicides in the hydrocarbon or bituminous material includes depositing the alkali metal silicide or mixture of alkali metal silicides into the reservoir along with injected steam prior to a well shut;
dissipating the heat from the steam and the alkali metal silicide-water reaction in the reservoir; and
heating the hydrocarbon or bituminous material with the dissipated heat.

17. The method of claim 16 further comprising:
recovering the hydrocarbon or bituminous material back through the same well.

18. The method of claim 1 further comprising:
depositing at least one of Na and Al metals into the reservoir to generate additional heat and hydrogen to supplement the alkali metal silicide or mixture of alkali metal silicides; and
creating zeolitic material precursors within the reservoir to facilitate hydrovisbreaking reactions.

19. The method of claim 1 further comprising:
applying a catalytic material to the alkali metal silicide or mixture of alkali metal silicides to promote hydrogenation of the hydrocarbon or bituminous material in situ.

20. The method of claim 19, wherein the application of the catalytic material to the alkali metal silicide or mixture of alkali metal silicides is performed prior to recovering the hydrocarbon or bituminous material with a well.

21. The method of claim 1 further comprising:
applying at least one of a surfactant or polymer to promote flow of the hydrocarbon or bituminous material toward a production well for recovery.

22. A method of recovering hydrocarbon or bituminous material from a subterranean reservoir comprising:
depositing a metal silicide or a mixture of metal silicides in the reservoir; and
reacting the metal silicide or mixture of metal silicides with water to generate hydrogen gas, heat, and a metal silicate that collectively enhance recovery of the hydrocarbon or bituminous material.

23. The method of recovering hydrocarbon or bituminous material from a reservoir formation of claim 22, wherein the metal silicide is a calcium silicide.

24. A system for recovering hydrocarbon or bituminous material from a subterranean reservoir comprising:
a metal silicide injection pump including a metal silicide or mixture of metal silicides slurry receiver and a metal silicide or mixture of metal silicides slurry depositing section extending in the reservoir; and
an injection well in fluid communication with the injection pump that receives the slurry of the metal silicide or mixture of metal silicides and houses their reaction with water to generate hydrogen gas, heat, and a metal silicate that collectively enhance recovery of the hydrocarbon or bituminous material.

25. A system for recovering hydrocarbon or bituminous material from a subterranean reservoir comprising:
an alkali silicide injection pump including an alkali metal silicide or mixture of alkali metal silicides slurry receiver and an alkali metal silicide or mixture of alkali metal silicides slurry depositing section extending in the reservoir; and
an injection well in fluid communication with the injection pump that receives the slurry of the alkali metal silicide or mixture of alkali metal silicides and houses their reaction with water to generate hydrogen gas, heat, and an alkali metal silicate that collectively enhance recovery of the hydrocarbon or bituminous material.

* * * * *